Figure 1:
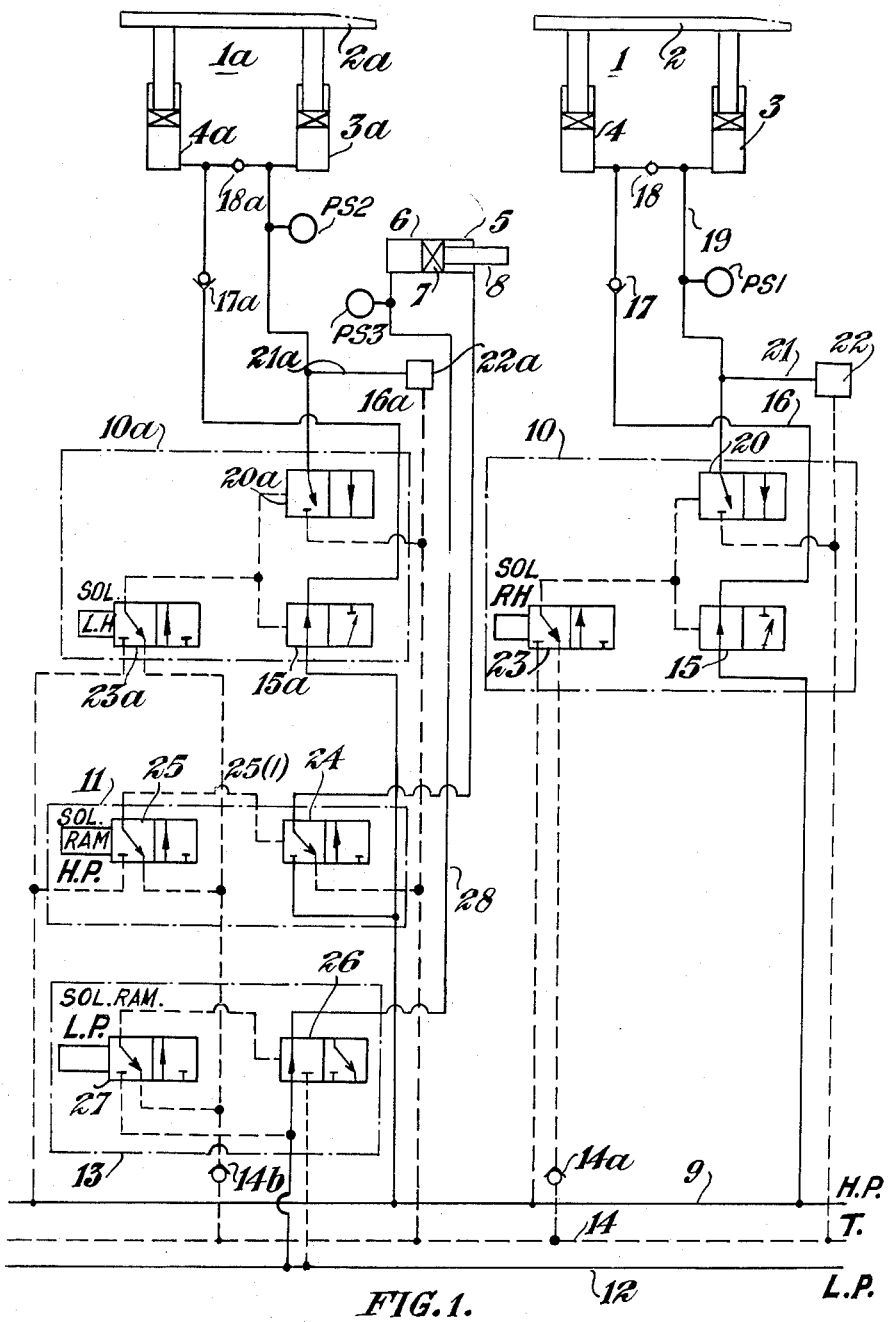

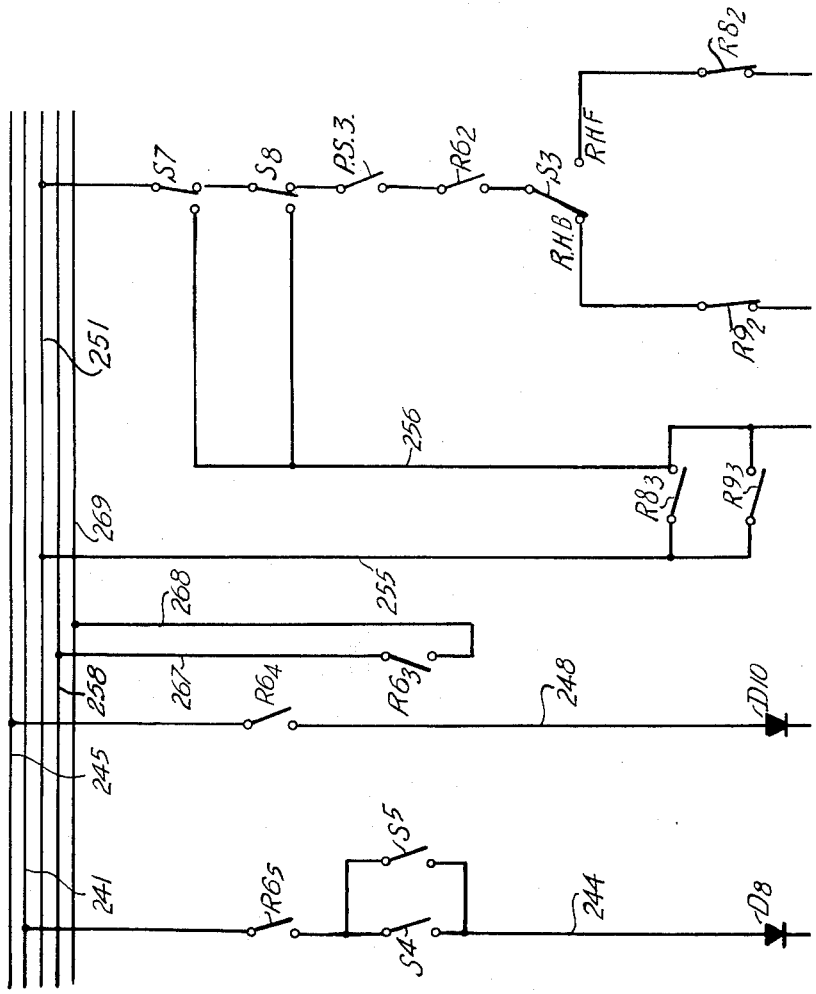

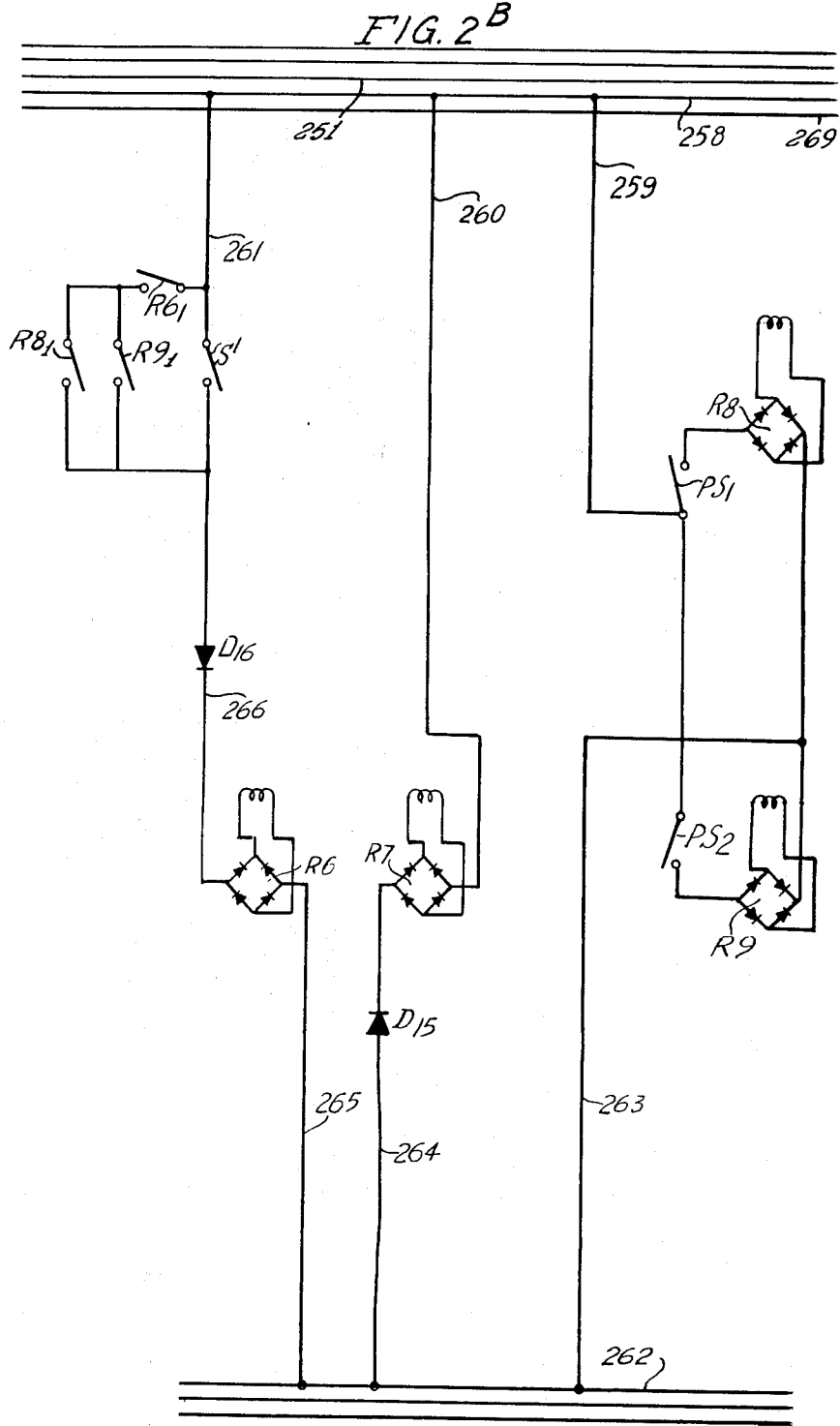

FIG. 2C

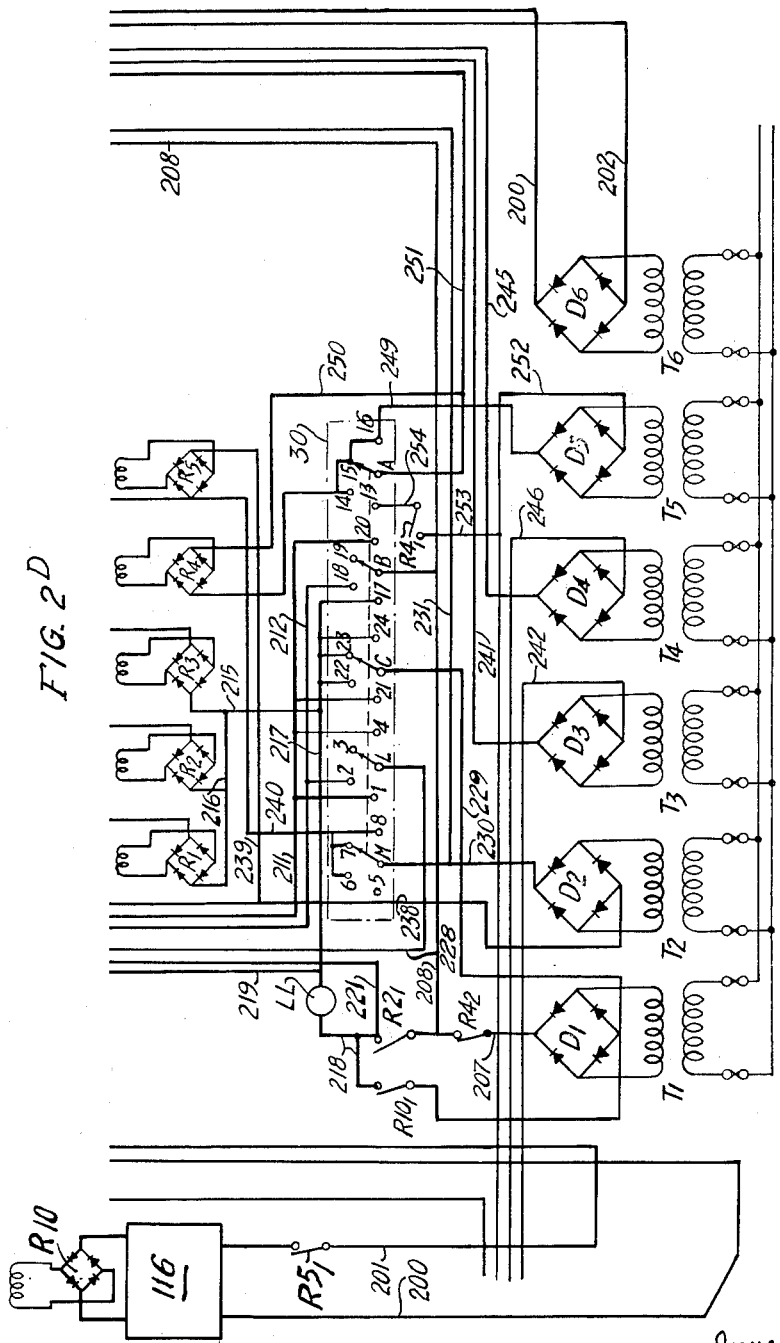

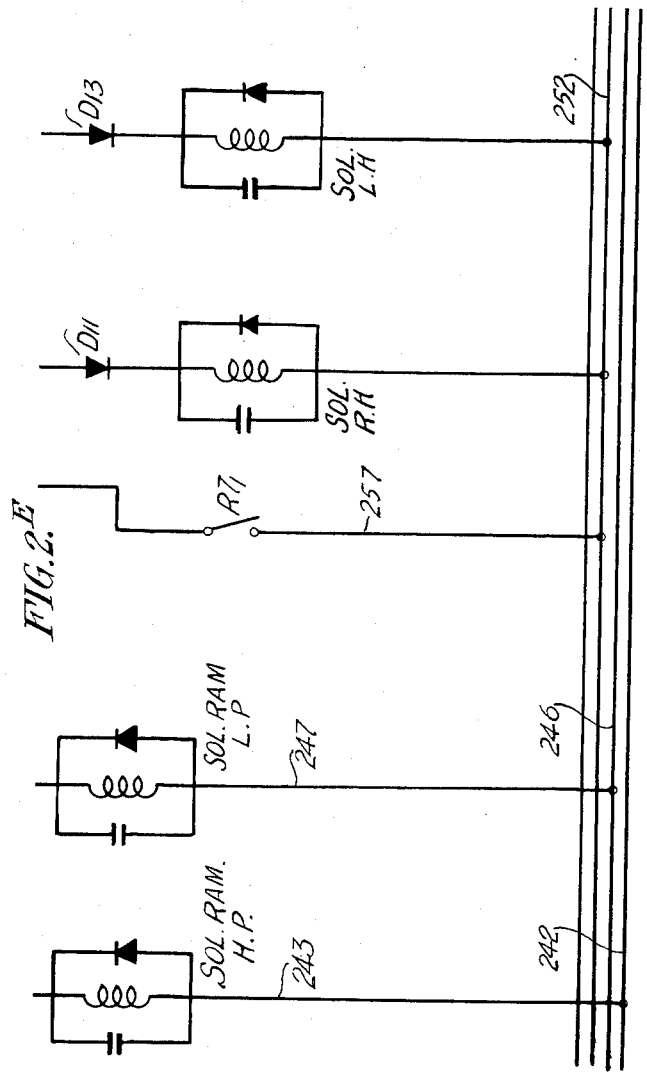

United States Patent Office

3,207,041
Patented Sept. 21, 1965

3,207,041
HYDRAULICALLY OPERATED ADVANCING ROOF SUPPORT SYSTEMS AND MONITORING SYSTEMS THEREFOR
John Phillips, Whiston, near Prescot, England, assignor to Electro-Hydraulics Limited, Warrington, England, a corporation of the United Kingdom
Filed June 8, 1962, Ser. No. 201,136
Claims priority, application Great Britain, June 12, 1961, 21,175/61; June 19, 1961, 22,120/61
6 Claims. (Cl. 91—1)

This invention relates to means for automatically operating roof supporting systems including a plurality of supporting units and particularly to means for operating hydraulically operated self-advancing roof support systems including a plurality of support units each made up of two frames having one or more hydraulically operated props, the frames being associated with a hydraulic ram whereby the frames may be advanced one at a time.

According to this invention, means for automatically operating hydraulically operated self-advancing mine roof supporting systems including a plurality of support units, comprise solenoid operated valves for controlling the supply of hydraulic fluid to each support unit, and the advancing means thereof, and means whereby the solenoid valves are selected for operation by uniselectors.

According to another aspect of this invention means automatically to operate one frame at a time of individual support units of a mine roof support system including a plurality of support units each made up of two frames having one or more hydraulically operated props, the frames being associated with an hydraulic ram whereby the frames may be advanced one at time, comprise solenoid operated valves to control supply of fluid pressure to the props of the frames and the advancing ram and uniselectors arranged sequentially to operate switch means in the electrical circuits of the solenoid valves of each unit.

Preferably the switch means comprises a relay arranged to be energised from an electrical source via a master control switch and the uniselectors so as to operate contacts provided in the electrical circuits of the solenoid operated valves, and further switch means are associated with the ram of each support unit which are arranged to be operated when the ram is in a position ready for the advance of one frame of the support selected for operation, so as to close a circuit to the said relay.

Preferably also still further switch means are associated with each support unit arranged to be operated dependent upon the position or condition of the support units so as to ensure the correct sequence of operation of the solenoid valves, and switch means are associated with the two frames arranged to be operated dependent upon their relative position so that only one frame is selected for advance at any one time.

Preferably provision is made for indicating the state of each support, whereby any malfunctioning can readily be detected and located. When this system is used in dangerous atmospheres, such as occur in coal mining, it will be appreciated that intrinsically safe or flameproof electrical components are used.

Other features of the invention will be apparent upon reading the following description.

This invention, amongst other advantages, provides economical use of electrical conductors. Thus if, for example, the two uniselectors are provided with 6 and 8 contacts respectively, then a total of 14 (6+8) conductors only is required for selection of any of 48 (6×8) roof support units. The most economical use occurs when a whole number square root may be taken of the number of roof supports to be controlled, and the uniselectors employed have the same number of contacts for connection to the separate switch means of each support, e.g., 144 supports may be selected by 24 wires (12+12). The method by which a roof support is selected is also important. Thus when two uniselectors are employed a numbering system is used whose base is such that the total number of roof supports can be expressed by two digits only, that is to say the supports are arranged in as many groups each group contacting as many units as the uniselectors have contacts.

The invention is herein described in relation to roof support units comprising two support frams each having a skid or floor bar, a roof bar and two hydraulic props, the two frames being associated with an advancing ram. Such a support unit is described in my co-pending application No. 81,835. In that support unit the piston rod of the advancing ram is intended to be connected to an anchorage in the mine, and the cylinder carries pulleys around which flexible ties are passed to connect the front ends and the rear ends of the frames together. The support frames are disposed in staggered relationship and arranged to be alternately lowered, advanced and raised to a roof supporting position, an anchorage being provided by the frame not being moved and for example a coal conveyor.

The system according to the present invention can equally well however be used in conjunction with other types of support unit, and the term "support unit" as used herein is intended to include single props, chocks, support frames and support units, which latter may comprise a plurality of support frames, props or chocks, with which an advancing ram is associated.

The invention is described below with reference to the accompanying drawings in which:

FIGURE 1 is a line diagram of the hydraulic system, and

Figure 2C:
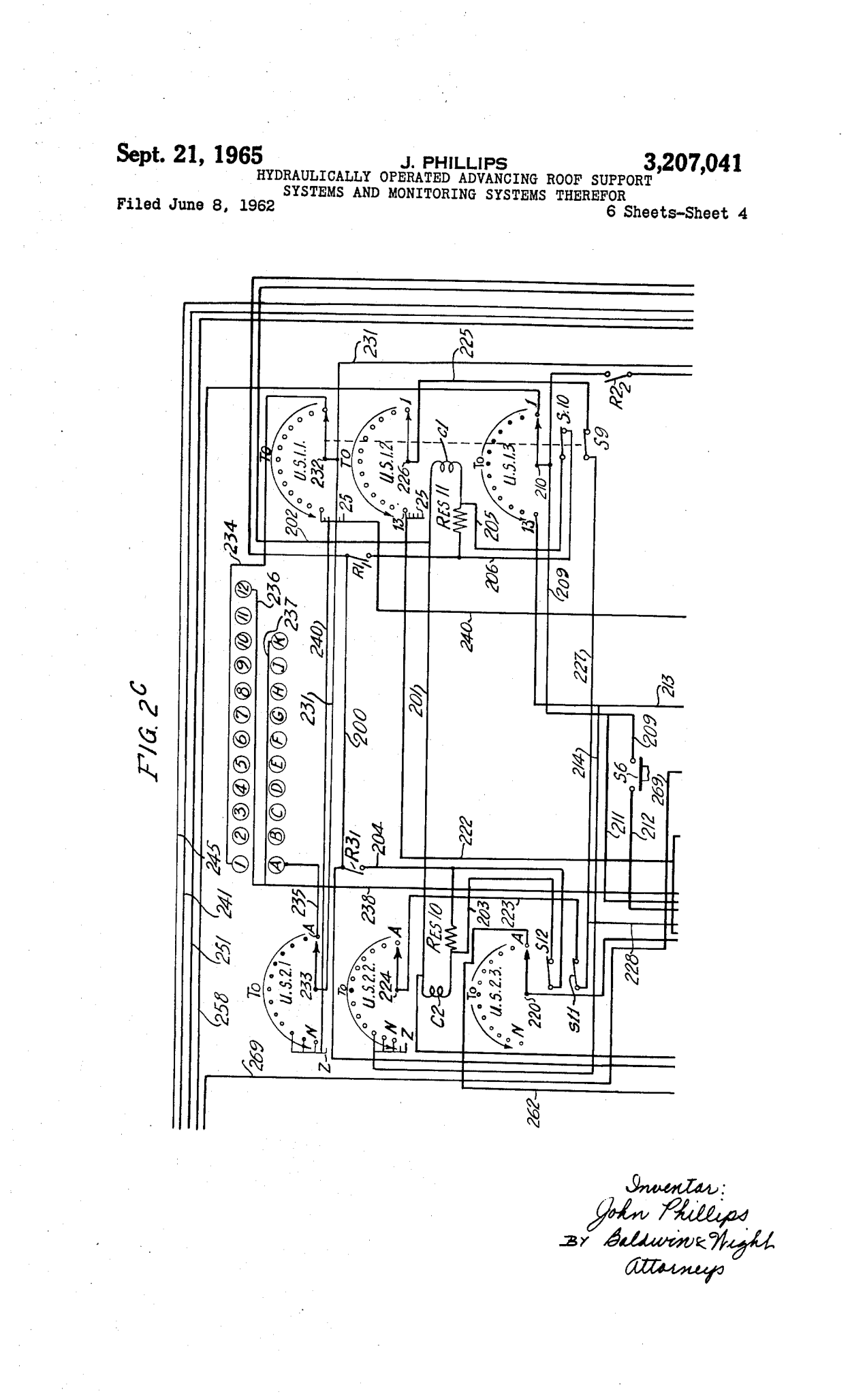

FIGURES 2A to 2E taken together form a circuit diagram of an arrangement of means for automatically operating the hydraulic system.

Referring to FIGURE 1, a support unit comprises a right hand and a left hand support frame 1 and 1a having roof bars 2, 2a, front props 3, 3a and rear props 4, 4a respectively. Each frame also has a floor skid (not shown), and is associated with an advancing ram 5, having a cylinder 6 operatively connected to the frames 1 and 1a as described in my co-pending application No. 81,835, the piston rod 8 of the ram, which is fast with a piston 7, being secured to an anchorage for example a coal conveyor also as therein described.

Four solenoid operated hydraulic control valves are provided for the support unit. Hydraulic fluid from a high pressure source H.P. is fed through a pipeline 9, to solenoid operated control valves 10 and 10a which control the supply of the high pressure fluid to the props of the right hand and left hand frames respectively, and to a solenoid operated control valve 11, which controls the supply of the high pressure fluid to annular area side of the ram 5. Hydraulic fluid from a low pressure source L.P. is fed through a pipeline 12 to solenoid operated valve 13 which controls the admission of low pressure fluid to the full area side of the ram 5. A pipeline 14 connects the valves 10 and 10a to tank T through non-return valves 14a and 14b respectively, and also connects the valves 11 and 13 to tank.

As already indicated a plurality of support units is arranged along the face being worked, and pipelines 9, 12 and 14 are similarly connected to the four solenoid operated hydraulic control valves of all the support units.

All the solenoid operated control valves are shown with their sections in the positions they adopt both when the solenoid is energised and de-energised. Thus the connections shown to the left hand side of each section are the connections effected when the solenoids are de-energised and the connections shown to the right hand side, the connections when the solenoids are energised.

The unit operates as follows:

Hydraulic fluid at high pressure passes through a section 15 of the valve 10, a pipeline 16, and a non-return valve 17 to the prop 4, and through a non return valve 18 to the prop 3 of the right hand frame 1. A branch line 19 is connected to a section 20 of the valve 10, to which branch line a pressure operated switch PS1 and a further branch line 21 is connected, the further branch line 21 leading to a pressure relief valve 22 which relieves into the tank line 14. The sections 15 and 20 of the valve 10 are controlled by a pilot valve 23 operated by a solenoid Sol. R.H. The hydraulic arrangement described for the valve 10 and the props 3 and 4 of the right hand frame 1 is duplicated for the left hand frame 1a, thus corresponding parts are given the same reference numerals but with the suffix a, the pressure operated switch in this case being shown at PS2. When the solenoids Sol. R.H. and Sol. L.H. are de-energised high pressure hydraulic fluid is fed to the props of both frames to maintain them in the roof supporting position. Fluid is retained in the props by sections 20 and 20a of the valves 10 and 10a, non-return valve 17, 17a, and by the relief valves 22 and 22a. When the solenoid Sol. R.H. is energised, high pressure fluid from the line 9 passes through the pilot valve 23 to change over the internal connections in the sections 15 and 20, as shown to the right hand side, and thus the hydraulic pressure supply to the props is cut off, and they are connected to tank T.

If excessive pressure builds up in the prop 4 when the solenoid is de-energised, the pressure will be communicated to the prop 3 through the non-return valve 18 and then through the branch pipelines 19 and 21 to the relief valve 22. On the other hand an excessive pressure in the prop 3 cannot be communicated to the prop 4 because of the non-return valve 18, but will of course be directly relieved via the valve 22. The operation of the valve 10a is identical to that of valve 10, but in normal operation both will not be energised simultaneously.

The control valve 11 comprises a main section 24 which is controlled by a pilot valve 25 operated by a solenoid Sol. Ram H.P. When the solenoid is de-energised the valve 11 cuts off the high pressure supply from the pipeline 9 to the annular side of the ram 5, and the latter is connected through the section 24 and pipeline 14 to tank. When the solenoid is energised high pressure fluid from the pipeline 9 passes through the pilot valve 25 to change the connections inside the section 24 to admit the high pressure fluid to the annular side of the ram 5.

The control valve 13 comprises a main section 26 which is controlled by a pilot valve 27 operated by a solenoid Sol. Ram L.P. When this is de-energised the low pressure supply in the pipeline 12 is connected to the full area side of the ram 5 through the section 26 and pipeline 28 to which a pressure operated switch P.S. 3, is connected. When the solenoid Sol. Ram L.P. is energised, low pressure fluid from the pipeline 12 is passed through the pilot valve 27 to change the connections inside the section 26 so as to cut off the low pressure supply to the full area side of the ram 5 which then is connected to tank through pipeline 28, section 26 and pipeline 14.

It will be seen that when the valves 10 and 10a are de-energised high pressure fluid is connected to the props of both the right hand and left hand frames 1, 1a to maintain them in a roof supporting position. If the high pressure supply fails, the non-return valves 17 and 17a prevent loss of pressure from the props, which thus remain in the roof supporting position. When the valves 11 and 13 are de-energised the annular side of the ram 5 is connected to tank and the full area side is connected to the low pressure supply.

The electrical circuit to be described below is for a working in which there are 120 support units similar to that of FIGURE 1. The number of support units is variable to suit the particular requirements. In the embodiment described the supports are arranged in ten groups labelled A to K, the letter I being omitted, each group consisting of 12 support units numbered A1 to 12, B1 to 12, etc.

Referring now to FIGURE 2, an A.C. input is fed to transformers T1, 2, 3, 4 and 5 for conversion to an intrinsically safe voltage output and to transformer T6 for conversion to a voltage suitable for operating uniselectors US1 and US2 according to flame proof requirements for safe operation in dangerous atmospheres. The A.C. output from transformers T1–6 is rectified to D.C. by rectifiers D1–6, respectively.

The support units are selected for operation by the two uniselectors each of which has three banks of contacts US1-1, 2, 3 and US2-1, 2, 3, the individual support units being selected via the banks US1-3 and US2-3. Banks US1-1 and US2-1 select lights in a panel of lights arranged in two rows labelled 1 to 12 and A to K respectively so that any support unit selected for operation can be indicated by two lights, one in each row. It will be seen that the banks of uniselector US1 require 12 contacts 1 to 12 and the banks of the uniselctor US2 require 10 contacts A to K. However in order to cater for support installations having a larger number of support units and in the interests of standardisation the uniselectors may have a larger number of contacts, for examle, 25. In this event the surplus contacts of banks US1-1 and US2-1 are connected together in series as are the corresponding contacts of banks US1-2 and US2-2 which are used for resetting the wiper arms of the uniselectors US1 and US2 back to contacts 1 and A respectively.

The wiper arms of the uniselectors are stepped on from one position to the next under the control of coils C1 and C2 which are energised and then de-energised to step on the wiper arms. The energisation of the coils opens switches S9, 10, 11 and 12 which close when the coils are de-energised, the coils being initially energised via the switches S10 and S12, but remaining energised after opening of these switches via resistances RES11 and 10 which serve to reduce the current consumption of the coils and enable non-continuously rated coils to be used.

A four position master control switch 30 having five banks of contacts M, L, C, B and A is provided for overall control of the operation of the support units. Thus the four positions from right to left are automatic, off, manual and monitor. In the circuit diagram the contacts controlled by the various relays are shown in the positions they adopt when the relays are de-energised except the contact R5₁ the relay R5 of which is normally energised for all positions of the master control switch except the monitor position and the wiper arms of the uniselectors are shown as selecting support unit A1 for operation. It is also assumed that the right hand frame of the support unit is fully back so that the switch S3 is in the position shown. Switches PS1, PS2, PS3 and switches S1, 3, 4, 5, 7 and 8 are associated with the props and advancing ram of each support unit as will be described. Switches S3, 7 and 8 are change-over switches and switches S1, 4 and 5 are normally open.

On switching the master control switch 30 to the automatic position there will be no movement of the support unit A1 until its advancing ram 5 is fully extended whereupon the normally open switch S1 will close.

It is arranged so as to remain closed until the ram is partially closed so as to allow for movement or float of the conveyor as the coal cutter goes past, and thus for example, if the stroke is 2 ft. 9 ins. the switch S1 might be set to open when the ram is retracted 9 ins. from the fully extended position.

Relay R6 is thus energised to close its contacts R6₁ to R6₅ the circuit being completed from rectifier D1 via conductor 207, normally closed contacts R4₂, conductor 208, contacts B and 20 of master control switch 30, conductor 211, conductor 209, wiper arm 210 and contact 1 of bank US1–3, conductors 258 and 261, switch S1, rectifier D16, conductor 266, relay R6, conductor 265, conductor 262, contact A and wiper arm 220 of bank US2–3, conductors 219 and 217, contacts 24 and C of master control switch 30, and conductor 229 back to rectifier D1. It will be noted that relay R7 remains de-energised because of rectifier D15.

Closure of contacts $R6_3$ energises relay R2 via conductors 267, 268 and 269, relay R2, conductors 216, 215 and 217, contacts 24 and C of master control switch 30, conductor 229 back to rectifier D1 thus closing the contacts $R2_1$ and $R2_2$ of relay R2. Closure of contacts $R2_1$ energises relay R1 and lights support operating lamp LL and closure of contacts $R2_2$ provides an alternative circuit from rectifier D1 to wiper arm 210 of bank US1–3 via conductor 208 by-passing the master control switch 30 so that if the master control switch is now turned to "off" a holding circuit is provided for the relay R6.

The circuit to the relay R1 is completed via conductor 207, contacts $R4_2$, contacts $R2_1$, conductor 221, relay R1, conductors 216, 215 and 217, contacts 24 and C of the master control switch 30 and conductor 229 back to rectifier D1.

Energisation of relay R1 closes its contacts $R1_1$ which completes a circuit to coil C1 from rectifier D6 to energise the coil, the circuit being via conductor 200, contacts $R1_1$, conductor 206, switch S10, conductor 205 or resistance RES11, coil C1 and conductor 202.

Closure of contacts $R6_4$ energises solenoid Sol. Ram L.P. the circuit being completed via rectifier D4, conductor 245, contacts $R6_4$, conductor 248, rectifier D10, Sol. Ram L.P., conductors 247 and 246 back to D4, so that the full area side of the advancing ram 5 is connected to tank.

As the pressure in the full area side of the advancing ram approaches zero, switch PS3 closes and a circuit is completed to solenoid Sol. R.H. to energise it, the circuit being from rectifier D5 through conductor 249, contacts 16, and A of master control switch 30, conductor 251, switches S7 and S8, switch PS3, contacts $R6_2$, contacts RHB of switch S3, contacts $R9_2$, rectifier D11, Sol. R.H. and conductor 252 back to rectifier D5. The energisation of Sol. R.H. releases pressure from the props of the right hand support frame and as the pressure falls therein switch PS1 closes to energise relay R8 via conductor 259, switch PS1, relay R8, conductors 263 and 262, so that the contacts $R8_1$ and $R8_3$ of the relay R8 close and the contacts $R8_2$ open. A holding circuit for relay R6 is thus provided from conductor 261 through contacts $R6_1$ and $R8_1$, and the opening of contacts $R8_2$ ensure that solenoid Sol. L.H. will not be energised when the switch S3 changes over to contacts RHF when the right hand frame of the support unit is subsequently advanced.

When the props of the right hand support frames have been lowered from the roof, switch S4 closes to energise solenoid Sol. Ram H.P. from rectifier D3 via conductor 241, contacts $R6_5$, switch S4, conductor 244, rectifier D8, Sol. Ram H.P., conductors 243 and 242 back to rectifier D3, so that high pressure fluid is supplied to the annular side of the advancing ram 5 to close it, and hence to advance the right hand support frame. After a short movement of the ram 5, switch S1 opens but relay R6 remains energised through the holding circuit. When the advancing ram is fully closed and the right hand support frame is fully forward the contacts of switch S3 change over to the RHF position, and thus Sol. R.H. is de-energised so that fluid pressure is supplied to these props to extend them into the roof supporting position. As the props extend switch S4 opens de-energising Sol. Ram H.P. so that the annular side of the advancing ram is now connected to tank and as the pressure builds up in the props switch PS1 opens deenergising relay R8. Contacts $R8_1$ are thus opened breaking the holding circuit for relay R6 which is thus de-energised, the contacts $R6_1$ to $R6_5$ of which then open, and simultaneously contacts $R8_2$ close.

The opening of contacts $R6_4$ de-energises Sol. Ram L.P. so that low pressure fluid is again applied to the full area side of the advancing ram. The opening of contacts $R6_2$ ensures that Sol. L.H. remains de-energised and the opening of contacts $R6_3$ de-energises relay R2 which opens contacts $R2_1$ and $R2_2$. The opening of contacts $R2_1$ extinguishes the lamp LL and de-energises relay R1 which opens contacts $R1_1$ thereby de-energising coil C1 causing the wiper arms of uniselector US1 to be stepped on to contacts 2, and the switches S9 and S10 to close. Support unit A2 is now selected for automatic advance in a similar manner to support unit A1, when its advancing ram extends to close its switch S1. Support units A3–A12 will similarly be advanced in turn.

When the right hand frame of support unit A12 is reset to support the roof after advance, its relay R6 is de-energised causing the wiper arms of uniselector US1 to be stepped on to position 13.

Relay R3 is then energised via conductor 207, contacts $R4_2$, conductor 208, contacts B and 20 of master control switch 30, conductors 211 and 209, wiper arm 210 and contact 13 of bank US1–3, conductor 213, relay R3, conductors 215 and 217, contacts 24 and C of master control switch 30, conductor 229 back to rectifier D1. This closes contacts $R3_1$ to energise coil C2.

Relay R1 is energised via conductor 207, contacts $R4_2$, conductor 208, contacts B and 20 of master control switch 30, conductor 211, contacts 4 and L of master control switch 30, conductors 228, 227, switch S9, conductor 225, wiper arm 226 and contact 13 of bank US1–2, conductor 222, relay R1, conductors 216, 215 and 217, contacts 24 and C of master control switch 30, conductor 229, back to rectifier D1.

Contacts $R1_1$ are thus closed energising coil C1 which opens switches S9 and S10, the opening of switch S9 immediately resulting in the de-energisation of relay R1, to open its contacts $R1_1$ and hence the de-energisation of coil C1 which steps the wiper arms of uniselector US1 on to contacts 14. This de-energises relay R3 since contact 14 of bank US1–3 is not connected to conductor 213 and thus contacts $R3_1$ are opened and the coil C2 is de-energised stepping on the wiper arms of uniselector US2 to contacts B.

The closing of switch S9 on the de-energisation of coil C1 re-energises relay R1 since contacts 13 to 25 inclusive of bank US1–2 are connected together in series and thus coil C1 is energised and de-energised in rapid succession through the switch S9 which causes the wiper arms of uniselector US1 rapidly to be stepped over contacts 13 to 25 back to contacts 1.

Support unit B1 is now selected for automatic advance when its ram is extended to close its switch S1 and support units B3 to B12 will be advanced in turn.

When the wiper arms of uniselector US1 pass over contacts 13 the wiper arms of uniselector US2 are stepped on as already described and the cycle of operations continues until all the support units have been advanced. When the wiper arms of uniselector US2 step on to contacts L a circuit is completed through relay R3 via conductor 207, contacts $R4_2$, conductor 208, contacts B and 20 of master control switch 30, conductor 211, contacts 4 and L of master control switch 30, conductor 228, conductor 227, switch S11, conductor 223, wiper arm 224, contact L of bank US2–2, conductor 214, conductor 213, relay R3, conductors 215 and 217, contacts 24 and C of master control switch 30 and conductor 229 back to rectifier D1. Contacts $R3_1$ are thus closed energising coil C2 which opens switch S11 breaking the circuit through relay R3 which is then de-energised, opening contacts $R3_1$ and de-energising coil C2 so that the wiper arms of uniselector US2 are stepped on to contacts M. Since the contacts L to Z of bank US2–2 are connected in series the sequence is repeated rapidly until the wiper arms are stepped over contacts N to Z back to contacts A. The entire cycle of advance of the 120 support units can then be recommenced, this time their left hand support frames being advanced.

It will be appreciated that as each individual support unit is selected for advance, circuits are completed to the corresponding lights in the panel of lights, the circuits being from rectifier D2 through conductors 230, 231, wiper arm 232 and the selected contact of bank US1–1 to the selected numbered light, conductors 236, 238 back to rectifier D2 and from conductor 231 to wiper arm 233 and the selected contact of bank US2–1 to the selected lettered light, conductors 237, 238 back to rectifier D2.

When the master control switch 30 is switched to "manual" and switch S6 is closed the wiper arms 210 and 220 of banks US1–3, US2–3 are connected to rectifier D1 through conductor 207, contacts $R4_2$, conductor 208, contacts B and 18 of master control switch 30, conductor 212, switch S6 and conductor 209 to wiper arm 210 and from conductor 229, contacts C and 22 of master control switch 30 and conductors 217 and 219 to wiper arm 220. Thus the selected support unit will be advanced in the same manner as already described for the "automatic" position.

If switch S6 is opened after the support unit selected has commenced its advancing sequence by the energisation of its relay R6, the release, advance and resetting of that support frame will be completed since the power supply to the relay R6 is maintained via the holding circuit provided by contacts $R2_2$ as already described.

Stepping on of the wiper arms over the surplus contacts is accomplished rapidly in the same manner as already described for the "automatic" position subject to switch S6 being closed. In this case contacts B and 18, 2 and L, and 22 and C are used instead of B and 20, 4 and L, and 24 and C of master control switch 30. The light indication of the selected support unit is as for the "automatic" position.

When the master control switch is switched to "off" (as shown) relay R5 alone is energised through conductor 230, contacts M and 7 of master control switch 30, conductor 240, relay R5 and conductors 239, 238 back to rectifier D2 so as to hold the contacts $R5_1$ open and retain the impulse unit 116 on open circuit.

It will also be noted that when the master control switch 30 is in the automatic and manual positions the relay R5 is maintained energised via contacts M and 8 and 6 respectively.

When the master control switch 30 is switched to its "monitor" position relay R5 is de-energised closing its contacts $R5_1$ which completes a circuit to the impulse unit 116 from rectifier D6 via conductor 200, impulse unit 116, conductor 201 and 202 back to rectifier D6.

The impulse unit 116 may comprise a conventional transistorised astable flip flop arranged successively to energise and de-energise relay R10 for predetermined intervals of time.

Thus it is arranged that the relay R10 should be energised for a sufficient period of time to close contacts $R10_1$ and allow for the energisation of relay R1, and closing of contacts $R1_1$ to energise coil C1, and should then be de-energised to cause stepping of the wiper arms of the uniselectors and to remain de-energised for a sufficient period of time to allow certain switches, relays and contacts to operate in the event of faulty operation of the props of the support unit selected so as to lock the selection before the relay R10 is re-energised.

When the relay R10 is energized to close contacts $R10_1$ a circuit is completed to relay R1 which is thus energized from rectifier D1 via conductor 207, contacts $R4_2$, conductor 208, contacts B and 17 of master control switch 30, conductors 217, 215, 216, relay R1, conductors 221, 218, contacts $R10_1$ back to rectifier D1, so that the contacts $R1_1$ close thereby energizing coil C1. Whilst contacts $R10_1$ are closed a circuit is completed through the operating lamp LL via conductor 217, lamp LL and conductor 218.

After a predetermined interval of time relay R10 is de-energized opening contacts $R10_1$ de-energizing relay R1 and hence the coil C1 to cause the wiper arms of uniselector US1 to step on to the next position.

Then after a further predetermined interval of time relay R10 is energised once more to energise relay R1 and coil C1 which upon de-energisation of the relay R10 is again de-energised to step on the wiper arms to the next position. This sequence of operation continues until the wiper arms reach contacts 13.

As the wiper arm of the bank US1–1 steps round from position 1 to position 12 it will be seen that circuits are complete to the lights in the panel of lights to indicate the support unit selected.

When the wiper arm 210 of bank US1–3 reaches contact 13, relay R3 is energised from rectifier D1 via conductor 207, contacts $R4_2$, conductor 208, contacts B and 17 of the master control switch 30, conductors 217, 215, relay R3, conductor 213, contact 13 and wiper arm 210, conductors 209, 211, contacts 21 and C of the master control switch 30 and conductor 229 back to rectifier D1, so that contacts $R3_1$ close to energise coil C2. Relay R5 is now energised from rectifier D2 via conductors 230 and 231, wiper arm 232 and contact 13 of bank US1–1, conductor 240, relay R5, conductors 239 and 238 back to rectifier D2. This causes contacts $R5_1$ to open, to cut impulse unit 116 out of circuit and consequently contacts $R10_1$ open, de-energising relay R1 and hence coil C1 to step the wiper arms of uniselector US1 onto position 14. The circuit to relay R3 is thus broken so that contacts $R3_1$ open and the coil C2 is de-energised to cause the wiper arms of uniselector US2 to step onto contacts B.

With the de-energisation of the coil C1, switch S9 closes to energise relay R1 via conductor 207, contacts $R4_2$, conductor 208, contacts B and 17 of master control switch 30, conductors 217, 215, 216, relay R1, conductor 222, contact 14 and wiper arm 226 of bank US1–2, conductor 225, switch S9, conductors 227, 228, contacts L and 1 of master control switch 30, conductor 211, contacts 21 and C of master control switch 30 and conductor 229 to rectifier D1. Coil C1 is thus energised once more which immediately causes switch S9 to open to de-energise relay R1 and hence the coil C1 to step on the wiper arms of US1 to contacts 15. Since the contacts 13 to 25 of bank US1–2 are connected in series, the coil C1 then continues to be rapidly energised and de-energised until the wiper arms return to contacts 1.

It will be appreciated that the impulse unit 116 is cut out of the circuit whilst uni-selector US1 is homed and brought into circuit again simultaneously with the resetting of the wiper arms back to contacts 1 so that selection of contacts 1 is held for the correct interval of time. Cutting of the impulse unt 116 out of circuit during homing incidentally expedites the resetting of the wiper arms back to contacts 1.

When the wiper arm 232 of bank US1–1 steps on from contact 25 to contact 1, relay R5 is de-energised closing contacts $R5_1$ so that the impulse unit 116 is once more energised.

The whole cycle of operations continues until the wiper arms of uniselector US2 step on to contacts L, when relay R5 is once more energised from rectifier D2, via conductors 230 and 231, wiper arm 233 and contact L of bank US2–1, conductor 240, relay R5, conductors 239, 238 back to rectifier D2 to open contacts $R5_1$ to take the impulse unit 116 out of circuit. At the same time relay R3 is energised from rectifier D1 via conductor 207, $R4_2$, conductor 208, contacts B and 17 of master control switch 30, conductors 217, 215, relay R3, conductors 213, 214, contact L and wiper arm 224 of bank US2–2, conductor 223, switch S11, conductors 227, 228, contacts L and 1 of master control switch 30, conductor 211, contacts 21 and C of master control switch 30, and conductor 229 back to rectifier D1. Contacts R3$_1$ thus close energising coil C2 opening switch S11 which breaks the circuit through relay R3 opening contacts R3$_1$ and de-energising coil C2 to cause the wiper arms of uniselector US2 to step on to contacts M. Since contacts L to Z of bank US2–2 are connected in series the sequence continues until the wiper arms return to contacts A. When wiper arm 233 of bank US2–1 steps on from contact Z to contact A relay R5 is de-energised closing contacts R5$_1$ to energise unit 116 once more, ready for the whole cycle to be repeated if desired.

While the above described monitoring operation is continuing, the relay R7 of the selected support unit is energised from rectifier D1 via conductor 207, contacts R4$_2$ conductor 208, contacts B and 17 of the master control switch 30, conductors 217, 219, wiper arm 220 and the selected contact, for example, A as shown, of bank US2–3, conductor 262, 264, rectifier D15, relay R7, conductors 260, 258, the selected contact, for example 1 as shown, and wiper arm 210 of bank US1–3, conductors 209, 211, contacts 21 and C of the master control switch 30, and conductor 229 back to rectifier D1. Energisation of relay R7 closes its contact R7$_1$, relay R6 remaining de-energise because of rectifier D16, for it will be seen that the polarity of the supply to the uniselector banks US1–3 and US2–3 is reversed for the monitoring operation.

This reversal of polarity enables monitoring to be carried out without requiring any additional conductors along the coal face.

The circuits to relays R6 are each provided with a rectifier D16 to prevent the energisation of any of the solenoids Sol. Ram H.P., Sol. Ram L.P., Sol. R.H. or Sol. L.H. during the monitoring operation. Rectifiers D8, D10, D11 and D13 adjacent the solenoids are provided for protective purposes.

Should the pressure in the props of a support unit have dropped below a predetermined value or should any of the props have become topped, then one or more of the switch PS1, PS2, S7 or S8 will be operated to effect energisation or relay R4.

Thus should switch PS1 and/or PS2 operate, relays R8 and/or R9 are energised so that the contacts R8$_3$ and/or R9$_3$ close, to connect conductor 251 to conductor 252 via conductor 255, contacts R7$_1$ and conductor 257 and operation of switches S7 or S8 will connect conductor 251 to conductor 252 via conductor 256, contacts R7$_1$ and conductor 257. When this occurs relay R4 is energised from rectifier D5 via conductor 249, contacts 16, 15, 14 of master control switch 30, relay R4, conductors 250, 251, 255 and/or 256, contacts R7$_1$, conductors 257, 252 back to rectifier D5.

Energisation of relay R4 closes contacts R4$_1$ to provide a holding circuit for relay R4, and opens contacts R4$_2$ to interrupt the circuit to uniselector banks US1–3 and US2–3, and thus prevent energisation of relay R1 when relay R10 is re-energised. Therefore the wiper arms of the uniselectors remain at their selection of the faulty unit which will be indicated by the appropriate lights in the light panel.

The master control switch 30 is then switched to off and the fault or faults rectified whereupon monitoring can be resumed.

It will be seen that all the relays are provided with a rectifier which is for surge suppression and each of the solenoids Sol. Ram H.P., Sol. Ram L.P., Sol. R.H. and Sol. L.H. are also provided with a rectifier and capacitor for the same purpose.

It is to be understood that the term uniselector used herein is meant to include any form of stepping relay.

To give a better understanding of the operation of the system a summary of its operation is given below: A support unit to be advanced is selected by the banks US1–3 and US2–3 of the two uniselectors and the automatic advance of the hind frame of the support unit selected is initiated by the closing of its switch S1 consequent on full extension of its advancing ram. This energises its associated relay R6 and closes its contacts R6$_1$ to R6$_5$ so as to effect the following sequence of operations:

First Sol. Ram L.P. is energised to disconnect the supply of low pressure fluid to the full area side of the advancing ram 5 and to connect this side of the ram 5 to tank. When the pressure on the full area side of the ram falls switch PS3 closes to energise Sol. R.H. or Sol. L.H. depending upon whether the right hand or left hand frame of the selected support unit is in the rear, thereby disconnecting the props of that frame from the high pressure supply and connecting them to tank so that they are lowered from supporting the roof.

When the support frame is lowered its switch S4 or S5 will close so that Sol. Ram H.P. is energised and high pressure fluid is admitted to the annular side of the advancing ram to close it and move the support frame forwards. When the support frame is fully forwards the switch S3 changes over so that Sol. R.H. or Sol. L.H. as the case may be is de-energised and pressure is re-admitted to the props so that the frame is raised into roof suppporting position. When the ram closes the switch S1 will be opened but the relay R6 will remain energised via the holding circuit which was provided upon energisation of the relay R8 or R9 upon closure of the switch PS1 or PS2 when the pressure in the props dropped. When the props extend, the switch S4 or S5 will open so that Sol. Ram H.P. is de-energised and the annular side of the advancing ram is connected to tank. When the pressure builds up again in the props of the frame which has been advanced, switch PS1 or PS2 opens and the holding circuit for relay R6 will be broken de-energising the relay so that low pressure fluid is re-admitted to the full area side of the advancing ram.

Subsequent support frames are advanced in a similar manner upon selection by the uniselector and closure of their respective switches S1. When an advancing movement has been initiated by energisation of the selected relay R6, support operating lamp LL lights to indicate that an advancing operation is taking place. Simultaneously with the selection of a support unit for advance the corresponding lights in the panel light up to identify the support unit selected for advance, the circuits being completed by way of banks US1–1 and US2–1.

Wiper arms of uniselector US1 and US2 are stepped round to select support units for advance in sequence by the energisation and de-energisation of coils C1 and C2. The energisation of coil C1 is effected when relay R6 for the selected support unit is energised by way of contacts R6$_3$ which energise relay R2 which in turn energises relay R1 to close the circuit to coil C1. When the advancing movement has been completed and relay R6 de-energises, contacts R6$_3$ open de-energising relay R2 which in turn de-energises relay R1 and coil C1 so that wiper arms of uniselector US1 are stepped on to the next contact. When the wiper arm of bank US1–3 is stepped on to contact 13, relay R3 is energised to close contacts R3$_1$ and energise coil C2. Relay R1 is energised by switch S9 and contact 13 of bank US1–2 to energise coil C1 which opens switch S9 de-energising relay R1 and de-energising coil C1 to step the wiper arms of uniselector US1 on to contacts 14. Simultaneously relay R3 is de-energised, de-energising coil C2 so that the wiper arms of uniselector US2 step on to the next contact; also switch S9 closes which reconnects the circuit through relay R1 to energise coil C1 and open switch S9, so that the uniselector is thus rapidly moved round to contact 1.

When the wiper arms of uniselector US2 step on to contacts L relay R3 is energised through switch S11 and bank US2–2, closing contacts R3$_1$ and energising coil C2 which opens switch S11, de-energising relay R3 and consequently coil C2 so that the wiper arms are stepped on to contacts M. Simultaneously switch S11 closes to energise relay R3 once more. Since contacts L to Z of bank US2–2 are connected together the wiper arms of uniselector US2 are thus stepped round rapidly in this manner until they return to contacts A in readiness for selecting the A support units for advance once more.

In the OFF position of master control switch 30, relay R5 is energised holding open contacts $R5_1$ so as to open circuit the impulse unit 116, and the appropriate lights in the light panel are lit to indicate the support unit selected for advance by the uniselectors.

When the master control switch is set at MANUAL, a selected support unit will not be advanced although its switch S1 be closed until the circuit to bank US1-3 is completed by the operator closing switch S6. Thus, initiation of the advance of the support unit is under the direct control of the operator. In this position of the master control switch the light indication of the selected support units is the same as for the AUTOMATIC position, as is the selection and advance of the support units except that the circuit from rectifier D1 to the wiper arm of bank US1-3 is completed through switch S6. Switch S6 is closed manually to initiate advance of the rear support frame of the selected unit and may be opened when lamp LL lights without interrupting the advancing movement of the frame which continues to completion since the alternative circuit to wiper arm 210 of bank US1-3 is closed via contacts $R2_2$, which provide a holding circuit for relay R6 consequent on energisation of the relays R6 and R2. This circuit will be broken when relay R6 is de-energised after the advancing movement has been completed. Further closure of switch S6 will initiate advance of the rear support frame of the next unit selected in like manner. Alternatively, switch S6 may be held closed whereupon the support units will advance automatically until switch S6 is released, but any advancing movement which has been initiated will be completed because of the holding circuit provided for relay R6 through contacts $R2_2$.

When the master control switch 30 is moved to the MONITOR position the relay R7 of each support unit and the corresponding indicator lights are successively selected in sequence by uniselectors US1 and US2. During monitoring relay R5 is normally de-energised so that impulse unit 116 has a circuit completed to it through contacts $R5_1$ from rectifier D6. Impulse unit 116 successively energises and de-energises relay R10 which causes energisation and de-energisation of relay R1 and hence coil C1 of uniselector US1 so as to step round the wiper arms of this uniselector. As before, relay R3 is energised when wiper arm 210 of bank US1-3 is stepped on to contact 13, so that coil C2 is energised by rectifier D6. De-energisation of coil C1 effected by impulse unit 116 then steps on the wiper arms of uniselector US1 to contacts 14 breaking the circuit to relay R3 which is de-energised, effecting de-energisation of coil C2 which steps on the wiper arms of uniselector US2 to the next contacts. Relay R5 is energised through contacts 13-25 of bank US1-1 to take the impulse unit out of circuit so that the wiper arms of uniselector US1 are stepped rapidly round to contact 1 in the same manner as described for the automatic advancing. Similarly relay R5 is also energised to take the impulse unit out of circuit when the wiper arms of uniselector US2 are stepped on to any of the contacts L to Z.

It will be seen that reversal of the polarity of the supply from rectifier D1 to banks US1-3 and US2-3 in conjunction with rectifiers D15 and D16 enables the same conductors 258, 262 to be used for selection and energisation of relay R6 for automatic and manual advance and relay R7 for monitoring. Thus relay R6 can only be energised for AUTOMATIC and MANUAL advance whilst relay R7 can only be energised for monitoring. Rectifiers D8, D10, D11 and D13 are fitted to prevent energisation of any of the solenoids Sol. Ram H.P., Sol. Ram L.P., Sol. R.H., and Sol. L.H. during the monitoring operation.

If the pressure is low in any of the props of the support frames or if any of the props are topped the monitoring will cease when the affected support unit is selected. Low pressure in any of the props will cause the closing of the corresponding switch or switches PS1 and PS2 which bring about energisation of their respective relays R8, R9 and closure of contacts $R8_3$, $R9_3$ when the affected support unit is selected by banks US1-3 and US2-3 of the uniselectors. Also if any of the props are topped the corresponding switches S7 and S8 will operate. Thus, in the event of low pressure or topping of the props of a selected support unit a circuit is completed to energise relay R4 from rectifiers D5 through switch S7 or S8, contacts $R9_3$ or $R8_3$ and contacts $R7_1$. Energisation of relay R4 closes contacts $R4_1$ to provide a holding circuit for relay R4 and opens contacts $R4_2$ to prevent further energisation of relay R1 when contacts $R10_1$ are closed by energisation of relay R10 and thus hold the uniselector wiper arms at their selection of the faulty support unit. When the fault or faults have been rectified, the monitoring can then be continued.

What is claimed is:

1. Automatically operating means for hydraulically operated, self advancing mine roof supporting systems which include a plurality of support units and an advancing ram for each support unit, said automatically operating means comprising a plurality of hydraulic valve means for controlling the supply of hydraulic pressure to each support unit and the advancing ram thereof, solenoid control means for said hydraulic valve means, two uni-selectors arranged sequentially to initiate selection for operation of the said hydraulic valve means of each support unit, first electrical switch means in number corresponding to the number of said support units and electrically connected in circuit with said solenoid control means, each said first electrical switch means being operated by its corresponding ram, after hydraulic pressure has fully extended said ram, to exhaust said ram to condition it for subsequent retraction to advance its support unit, a similar number of second electrical switch means, one for each of said support units, operable to permit release of its support unit to enable it to advance, and a similar number of third switch means, one for each of said support units, operable to actuate said uni-selectors to select the next support unit in sequence for operation.

2. The arrangement claimed in claim 1 in which the said first electrical switch means comprises in series a switch and a relay, a master control switch being provided for energising the relay through the uni-selectors.

3. An arrangement as claimed in claim 1 in which each support unit includes two frames movable independently of one another, said second electrical switch means also selecting one of said two frames for movement.

4. An arrangement as claimed in claim 2 in which a further relay is provided in electrical circuit with said first relays for ensuring completion of movement of one of said support units before movement of any other of said support units is initiated.

5. An arrangement as claimed in claim 1 in which each uni-selector includes at least two banks of contacts and further comprising indication means connected in circuit with said uni-selectors and means for reversing the polarity in one bank of each uni-selector for monitoring, a positive electrical potential normally being supplied through one of said uni-selectors and the negative return through the other uni-selector.

6. Automatically operating means for hydraulically operated, self advancing mine roof supporting systems which include a plurality of support units and an advancing ram for each support unit, said automatically operating means comprising a plurality of hydraulic valve means for controlling the supply of hydraulic pressure to each support unit and the advancing ram thereof, solenoid control means for said hydraulic valve means, two uni-selectors arranged sequentially to initiate selection for operation of the said hydraulic valve means of each support unit, first electrical switch means in number corresponding to the number of said support units and electrically connected in circuit with said solenoid control means, each said first electrical switch means being operated by its corresponding ram, after hydraulic pressure has fully extended said ram, to exhaust said ram to condition it for subsequent retraction to advance its support unit, a similar number of second electrical switch means, one for each of said support units, operable to to permit release of its support unit to enable it to advance, and a similar number of third switch means, one for each of said support units, operable to actuate said uni-selectors to select the next support unit in sequence for operation via said first electrical switch means.

References Cited by the Examiner

UNITED STATES PATENTS 2,799,811   7/57   Lindars _____ 307—141.4 X

FOREIGN PATENTS 856,719   12/60   Great Britain.

SAMUEL LEVINE, *Primary Examiner.*

JACOB L. NACKENOFF, *Examiner.*